United States Patent
Zabe

(10) Patent No.: US 12,379,022 B2
(45) Date of Patent: Aug. 5, 2025

(54) DEVICE FOR ADJUSTING A SPROCKET OF A CHAIN DRIVE

(71) Applicant: DEERE & COMPANY, Moline, IL (US)

(72) Inventor: Mickael Zabe, Ougney (FR)

(73) Assignee: DEERE & COMPANY, Moline, IL (US)

( * ) Notice: Subject to any disclaimer, the term of this patent is extended or adjusted under 35 U.S.C. 154(b) by 568 days.

(21) Appl. No.: 17/931,922

(22) Filed: Sep. 14, 2022

(65) Prior Publication Data

US 2023/0133649 A1    May 4, 2023

(30) Foreign Application Priority Data

Oct. 29, 2021 (DE) .......................... 102021128386.8
Oct. 29, 2021 (DE) .......................... 102021128389.2

(51) Int. Cl.
*F16H 55/00* (2006.01)
*A01F 15/00* (2006.01)
*A01F 15/08* (2006.01)
*F16H 55/30* (2006.01)

(52) U.S. Cl.
CPC .......... *F16H 55/30* (2013.01); *A01F 15/085* (2013.01)

(58) Field of Classification Search
CPC .............................. F16H 55/30; A01F 15/085
See application file for complete search history.

(56) References Cited

U.S. PATENT DOCUMENTS

| | | | | |
|---|---|---|---|---|
| 2,127,031 A | * | 8/1938 | Johnson | F16H 9/16 474/146 |
| 2,343,084 A | * | 2/1944 | Rich | F16H 7/1254 474/135 |
| 3,110,379 A | * | 11/1963 | Baker, III | B62L 5/16 192/217.3 |
| 3,709,466 A | * | 1/1973 | Dowrelio | B66D 1/7447 192/93 A |
| 4,069,719 A | * | 1/1978 | Cancilla | B62M 9/16 474/134 |
| 4,299,318 A | * | 11/1981 | Segawa | B62M 9/10 474/158 |

(Continued)

FOREIGN PATENT DOCUMENTS

| | | |
|---|---|---|
| CN | 201640029 U | 11/2010 |
| CN | 102192042 A * | 9/2011 |
| DE | 3134238 A1 | 8/1982 |

(Continued)

OTHER PUBLICATIONS

Translation of CN 102192042 to Hayato (Year: 2011).*

(Continued)

*Primary Examiner* — Claude J Brown

(57) ABSTRACT

A sprocket adjuster for adjusting a sprocket of a chain drive includes a bearing journal, which includes a free end and a fixed end, a rotary bearing arranged on the bearing journal, and a sprocket guided on the rotary bearing. The bearing journal has a first external thread region and a second external thread region, wherein a threaded nut is arranged on each of the external thread regions and by means of which the rotary bearing is clamped on the bearing journal between the external thread regions.

16 Claims, 5 Drawing Sheets

(56) References Cited

U.S. PATENT DOCUMENTS

| | | | |
|---|---|---|---|
| 6,272,825 | B1 | 8/2001 | Anderson et al. |
| 2021/0039748 | A1 | 2/2021 | Braedt et al. |

FOREIGN PATENT DOCUMENTS

| | | | |
|---|---|---|---|
| DE | 19632762 A1 | | 2/1998 |
| DE | 102020107416 A1 | | 10/2020 |
| EP | 2952089 A1 | | 12/2015 |
| GB | 189717578 A | | 9/1897 |
| GB | 190204923 A | | 6/1902 |
| GB | 191117241 A | | 4/1912 |
| GB | 191211381 A | * | 5/1912 |
| GB | 115153 A | | 5/1918 |

OTHER PUBLICATIONS

Extended European Search Report and Written Opinion issued in European Patent Application No. 22200451.7, dated Mar. 2, 2023, in 07 pages.

Extended European Search Report and Written Opinion issued in European Patent Application No. 22200452.5, dated Mar. 24, 2023, in 07 pages.

* cited by examiner

DEVICE FOR ADJUSTING A SPROCKET OF A CHAIN DRIVE

CROSS-REFERENCE TO RELATED APPLICATIONS

This application claims the benefit of German Patent Application DE 102021128386.8 filed on Oct. 29, 2021, and German Patent Application DE 102021128389.2 filed on Oct. 29, 2021, the disclosures of which are hereby incorporated by reference.

TECHNICAL FIELD

The disclosure generally relates to a sprocket adjuster for a chain drive, in particular for a chain drive for driving pressing rollers or pressing belts of a round baler for pressing crops.

BACKGROUND

The prior art discloses a multiplicity of round balers, with a distinction being drawn between round balers having a fixed pressing chamber and round balers having a variable pressing chamber. Round balers having a fixed pressing chamber are distinguished by the fact that a plurality of pressing rollers are arranged over the circumference of a defined cylindrical pressing chamber and delimit the pressing chamber in a circumferential direction. The cylindrical pressing space is delimited at the end sides by respective side walls. By contrast, round balers having a variable pressing chamber are distinguished by the fact that the cylindrical pressing space is delimited in the circumferential direction by one or more pressing belts, with the pressing belt being guided over a plurality of rollers. The circumference of the pressing space is configured to be variable by positionally changing one or more rollers during the pressing operation. The cylindrical pressing space is likewise delimited at the end sides by respective side walls. It is also known that both the pressing rollers of a round baler having a fixed pressing chamber and the rollers of a round baler having a variable pressing chamber can be driven or caused to rotate via a chain drive. Such chain drives are arranged on a frame of the round baler on one or both side walls outside of the pressing space. Here, the chain drive comprises a plurality of toothed wheels or sprockets which are connected to the pressing rollers or to rollers, with the sprockets being in drive connection via one or more drive chains.

Such a round baler is known from DE 196 32 762 A1, for example. A drive device for the pressing rollers, which delimit a pressing chamber, of a round baler is shown therein, with a plurality of chain drives being provided. The individual chain drives each serve for driving a partial number of the overall pressing rollers to be driven, with drive sprockets for driving the individual chain drives being able to be driven jointly. The sprockets intended for driving the pressing rollers are arranged on a circular arc in a lateral housing part of the round baler and the chain drives are mounted parallel to one another.

A further round baler from the prior art is shown in EP 2 952 089 A1, in which a plurality of pressing rollers are arranged around a pressing chamber and bear sprockets driven by a chain drive with a common chain. At least one of the sprockets and the associated pressing roller have interacting guide means, in the form of a shaft external toothing on the pressing roller and a hub internal toothing, interacting therewith, on the sprocket, which connect the sprocket and the pressing roller in a form-fitting manner in a direction of rotation and allow a movement of the sprocket in the axial direction of the pressing roller. Also provided are means for fixing the axial position of the sprocket in the form of a shaft nut, which is fastened to the pressing roller stub, and an external toothing engaging therewith. The configuration of the pressing rollers and sprockets that is disclosed here is suitable for drive-transmitting sprockets, but proves to be cost-intensive and complicated to manufacture. However, it does not satisfy the requirement of axial adjustability of the sprockets for the purpose of fine adjustment within the chain drive.

In the case of the aforementioned chain drives, it is customary for the chain to be guided from a drive sprocket to the sprockets which are to be driven of the pressing rollers, with, on the one hand, a chain guide with a plurality of windings and loop-like guidance of the chain being required, in particular to allow pivoting of the pressing rollers in order to open the pressing chamber. On the other hand, such a chain drive has to be held in tension. To make this possible, a chain drive of the aforementioned type has, in addition to the sprockets to be driven, further sprockets arranged therein which, within the chain drive, for the purpose of the aforementioned chain guidance, serve as deflection sprockets or guide sprockets and/or as sprockets for tensioning the chain drive. These further sprockets are freewheeling and are usually guided on a rotary bearing which is mounted on a bearing journal, which extends from the frame of the round baler, or is mounted on a bearing journal of a chain-tensioning device. Such freewheeling sprockets must also be subject to axial fine adjustment in order to lie precisely in the run of the chain. The fine adjustment of the sprockets mounted on the bearing journals usually occurs by means of spacer disks which are mounted on both sides of the end sides of the rotary bearing on the bearing journal, as is known, for example, from the mountings of the chain drives on a John Deere round baler of the F441 R type. This method of axial fine adjustment often proves to be very time-consuming and can occasionally require the multiple mounting and demounting of the sprocket on the bearing journal. The application of the above-described solution for fine adjustment of driven sprockets is unsuitable or not practicable for the axial fine adjustment of a freewheeling sprocket guided on a rotary bearing.

SUMMARY

According to the disclosure, a sprocket adjuster of the type stated at the outset is designed in such a way that the bearing journal has a first external thread region and a second external thread region. A threaded nut is arranged on each of the external thread regions and thereby the rotary bearing is clamped on the bearing journal between the external thread regions. The arrangement of threaded nuts axially on both sides of the rotary bearing allows precise axial displacement of the rotary bearing by means of simple rotation of the threaded nuts. Axial fine adjustment of the sprocket is made possible regardless of a thickness of a spacer disk. There is no need for laborious demounting of the sprocket or of the rotary bearing from the bearing journal in order, for example, to place a thicker or thinner spacer disk between the sprocket and frame.

A spacer element can be provided between a threaded nut and a corresponding end face side of the rotary bearing. The spacer element is placed between the threaded nut and the corresponding end side of the rotary bearing, with the result that the threaded nut does not come into direct contact with the rotary bearing. This avoids transmission of rotation to the threaded nut and loosening of the threaded nut as a result of vibration and rotational movements of the rotary bearing during operation. Moreover, it is possible by means of the spacer element, with the same configuration of the thread turns on bearing journals of the same length, for the axial rough positioning of the sprocket on the bearing journal to be configured to be very variable without having to excessively change the position of the threaded nuts. Consequently, the number of thread turns on the bearing journal, and hence also the manufacturing effort for the external thread on the bearing journal, can be minimized and an adjusting region can be variably configured.

A simple embodiment of a spacer element is represented by a bushing, sleeve or disk which is pushed onto the bearing journal and is clamped between the threaded nut and end side of the rotary bearing, on one side or else on both sides of the rotary bearing. A further embodiment provides the use of one or more cup springs which can serve as a spacer element, with these being able to be arranged in addition to or in place of the aforementioned spacer elements. One or more cup springs place the threaded nuts under a certain stress, with the result that an additional anti-rotation safeguard against loosening of the threaded nuts is created. Furthermore, it is thus also possible to achieve a spring-preloaded axial displacement of the sprocket if a cup spring is arranged only on one side of the rotary bearing. In this case, an adjustment of the threaded nut arranged on the opposite side of the cup spring brings about compression or expansion of the cup spring. Depending on the adjusting direction of the threaded nut, an associated increasing or decreasing spring tension causes an axial displacement of the rotary bearing on the bearing journal. Here, the described axial displacement of the rotary bearing can already be achieved by adjusting only one of the threaded nuts.

The diameter of the first external thread region is designed to be greater than the diameter of the second external thread region, wherein the second external thread region extends starting from the free end of the bearing journal, and the first external thread region extends between the fixed end and the rotary bearing. Different diameters of the external thread portions, starting from a smaller diameter at the free end of the bearing journal, allow mounting of the device just through access to the free end of the bearing journal. This makes possible a non-demountable fastening of the fixed end of the bearing journal to the frame of the round baler, for example by a welded connection or as a cast or forged part of a frame part of the frame. A bearing journal region without a thread, on which the rotary bearing is received, is preferably provided between the external thread regions of the bearing journal. Consequently, the bearing journal region on which the rotary bearing is received can be produced independently of the thread regions and with sizes differing therefrom in terms of diameter and can be tailored to an optimum snug fit for the rotary bearing.

In an alternative exemplary embodiment which displays the same technical effect of the device, an internal thread region, on which a clamping plate is fastened via a clamping screw, is provided in place of the second external thread region on the free end of the bearing journal and the associated threaded nut, wherein the rotary bearing is clamped on the bearing journal between the external thread region and the clamping plate. Consequently, the clamping function of the threaded nut on the second external thread region of the preceding example is replaced by the clamping plate. All further above-described embodiments can also be used in this alternative example. It is thus possible, for example, that in this case, too, a spacer element is provided between the threaded nut and/or the clamping plate and a corresponding end face side of the rotary bearing, wherein the spacer element can correspondingly also take the form of a bush, sleeve, disk or cup spring.

The above-described sprocket adjuster is particularly suitable for use in a chain drive for driving pressing rollers or pressing belts of a round baler for pressing crops. Here, the device can be used on one or more sprockets of the chain drive.

The aforementioned chain drive is able to be used in a wide variety of types of agricultural machines in which rolls, rollers, drums or other rotating bodies have to be driven. However, it is particularly suitable for use in a round baler having a frame, a pressing space and pressing rollers or pressing belts which are arranged on the frame and surround the pressing space and are intended for pressing crops, wherein the chain drive is arranged on the frame and/or a side wall of the round baler for driving the pressing rollers or the pressing belt.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
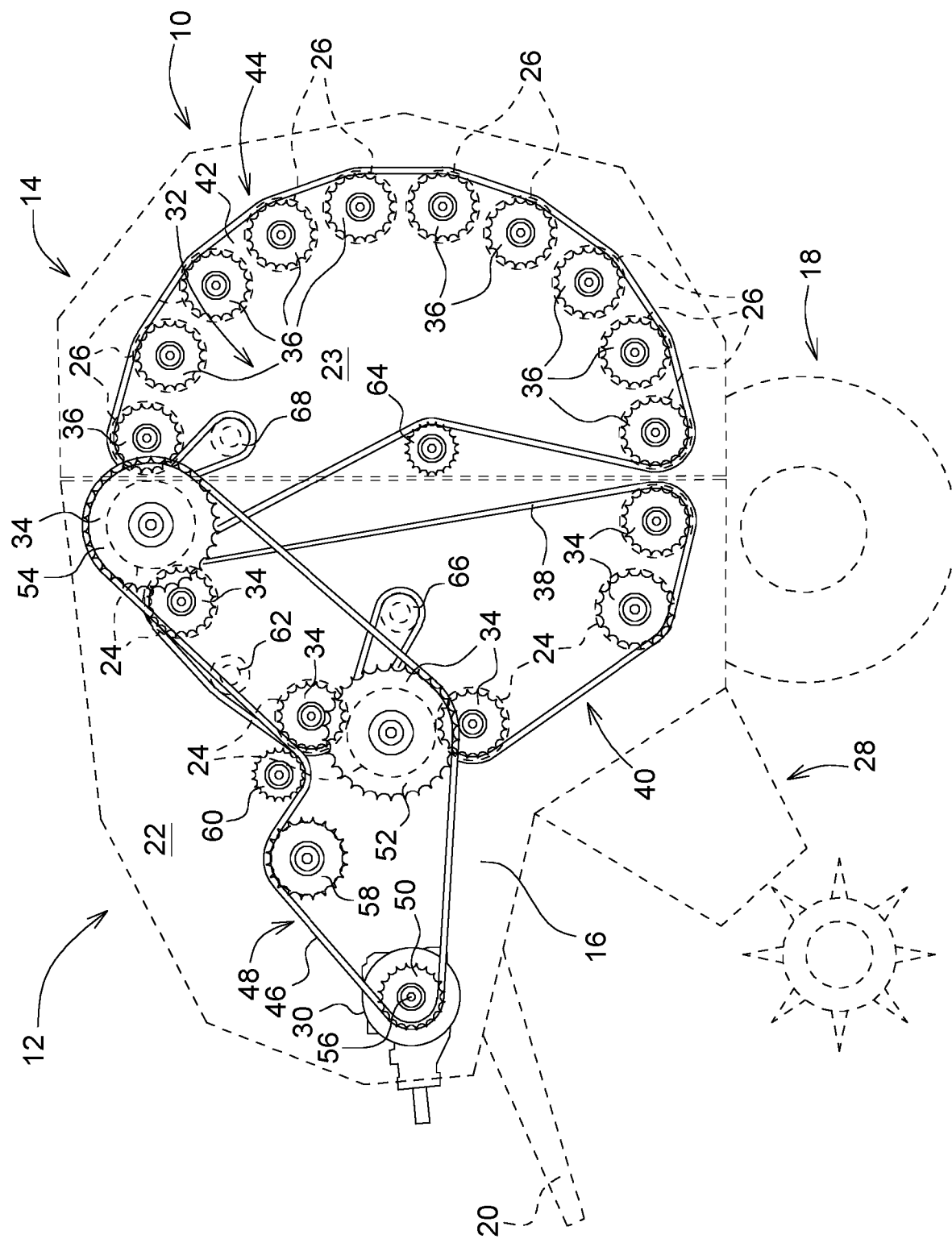
FIG. 1 is a schematic side view of a round baler having a chain drive for driving pressing rollers.
Figure 2:
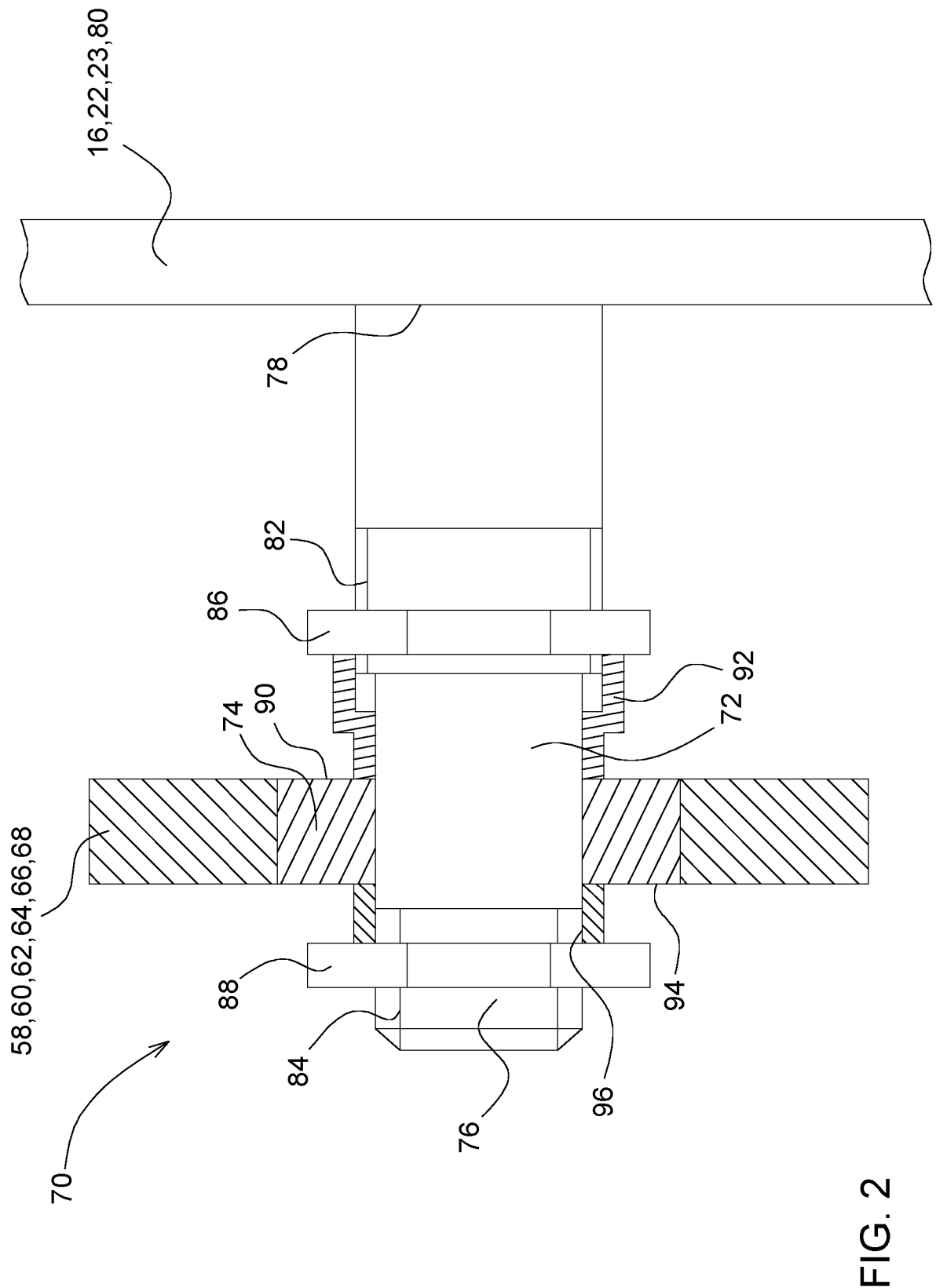
FIG. 2 is a schematic cross-sectional view of a sprocket adjuster for adjusting a sprocket of the chain drive from FIG. 1.

Referring to the Figures, wherein like numerals indicate like parts throughout the several views, a round baler is generally shown at 10 in FIG. 1. Referring to FIG. 1, the round baler 10 includes a front part 12 and a rear part 14.

The round baler 10 further comprises a frame 16, a running-gear unit 18, a drawbar 20, side walls 22 on the front part 12, side walls 23 on the rear part 14, pressing rollers 24 on the front part 12, pressing rollers 26 on the rear part 14, a feed assembly 28 for receiving a crop, and a drive device 30.

The frame 16 consists of struts and the like which hold together and support the aforementioned components and thus form the front part 12 into a unit.

The running-gear unit 18 is composed, in a manner which is not indicated in more detail, of an axle and of wheels mounted thereon which are situated in the lower rear region of the front part 12 and support the entire round baler 10 such that it can move on the ground.

The drawbar 20 serves for connecting the round baler 10 to a towing vehicle, for example to an agricultural tractor, and is fixedly connected to the frame 16.

The side walls 22, 23 are also fixedly connected to the frame 16 and terminally close off a pressing chamber 32. For this purpose, the side walls 22, 23 assume a distance from one another and movably receive the pressing rollers 24 and 26. In the upper rear region of the front part 12 there is provided a bearing (not shown) which serves for the vertically pivotable connection of the rear part 14. The side walls 22, 23 are connected to one another by cross-struts, which are not indicated in further detail but are sufficiently well known.

The pressing rollers 24 and 26 are composed in a known manner of a sheet-metal shell and of a shaft or shaft stubs. The center points of the pressing rollers 24 and 26, that is to say their axes of rotation, are situated substantially on a part of a circle which surrounds the pressing chamber 32. On at least one side of the round baler 10, on the outer side of the side walls 22, 23, sprockets 34 are provided on the pressing rollers 24 at the front part 12, and sprockets 36 are provided on the pressing rollers 26 at the rear part 14. The sprockets 34 of the pressing rollers 24 are surrounded by a drive chain 38 of a first chain drive 40. The sprockets 36 of the pressing rollers 26 are surrounded by a drive chain 42 of a second chain drive 44. A further drive chain 46 of a third chain drive 48 serves for driving the first and second chain drive 40 and 44. The third chain drive 48 is driven by a main drive sprocket 50 which is connected to the drive device 30. The third chain drive 48 drives a first drive sprocket 52 which serves for driving the first chain drive 40. The third chain drive 48 additionally also drives a second drive sprocket 54 which serves for driving the second chain drive 44. The first and second drive sprocket 52 and 54 are each double-toothed, with a first toothing of the first drive sprocket 52 and a first toothing of the second drive sprocket 54 being connected to the third chain drive 48. A second toothing of the first drive sprocket 52 is connected to the first chain drive 40 and drives the latter. A second toothing of the second drive sprocket 54 is connected to the second chain drive 44 and drives the latter.

The drive device 30 is, in a manner which has not been shown, powered by the towing vehicle, for example via an articulated shaft, and contains a transversely extending shaft 56 in the rear region of the drawbar 20. Emanating from the shaft 56 is the main drive sprocket 50 which drives the third chain drive 48.

The chain drives 40, 44 and 48 are guided over additional sprockets 58, 60, 62, 64 and tensioned by means of tensioning devices, which are not indicated in more detail. Furthermore, a sprocket 66 is provided for the first chain drive 40 and a sprocket 68 is provided for the second chain drive 44 for guiding or deflecting the respective drive chains 38, 42.

FIGS. 2 to 5 each show sprocket adjuster devices 70 for adjusting the additional sprockets 58, 60, 62, 64, 66 and 68, with the sprockets 58, 60, 62, 64, 66 and 68 each being arranged on a bearing journal 72 of such a device 70. In addition to the bearing journal 72 and one of the sprockets 58, 60, 62, 64, 66 and 68 to be adjusted, the device 70 comprises a rotary bearing 74, which is arranged on the bearing journal 72, and the sprocket 58, 60, 62, 64, 66 and 68 guided on the rotary bearing 74. The bearing journal 72 comprises a free end 76 and a fixed end 78. The latter is fastened to the frame 16, to the side walls 22, 23 or to a tensioning arm 80 of a tensioning device (not indicated in more detail). The fastening of the bearing journal can occur in a demountable (releasable) manner in any desired form or in a non-releasable manner, for example by means of welding or by means of a connection produced in the casting or forging process of the tensioning arm 80. The bearing journal 72 also has a first external thread region 82 and a second external thread region 84, with the diameter of the first external thread region 82 being designed to be greater than the diameter of the second external thread region 84. A first threaded nut 86 is screwed onto the external thread region 82, and a second threaded nut 88 is screwed onto the second external thread region 84. Between the first threaded nut 86 and an end face 90 of the rotary bearing 74 that faces it, there is provided a first spacer element 92 in the form of a spacer sleeve or spacer bush. Between the second threaded nut 88 and an end face 94 of the rotary bearing 74 that faces it, there is provided a second spacer element 96, likewise in the form of a spacer sleeve or spacer bush. The spacer elements 92 and 96 can here also take the form of spacer disks or washers.

Figure 3:
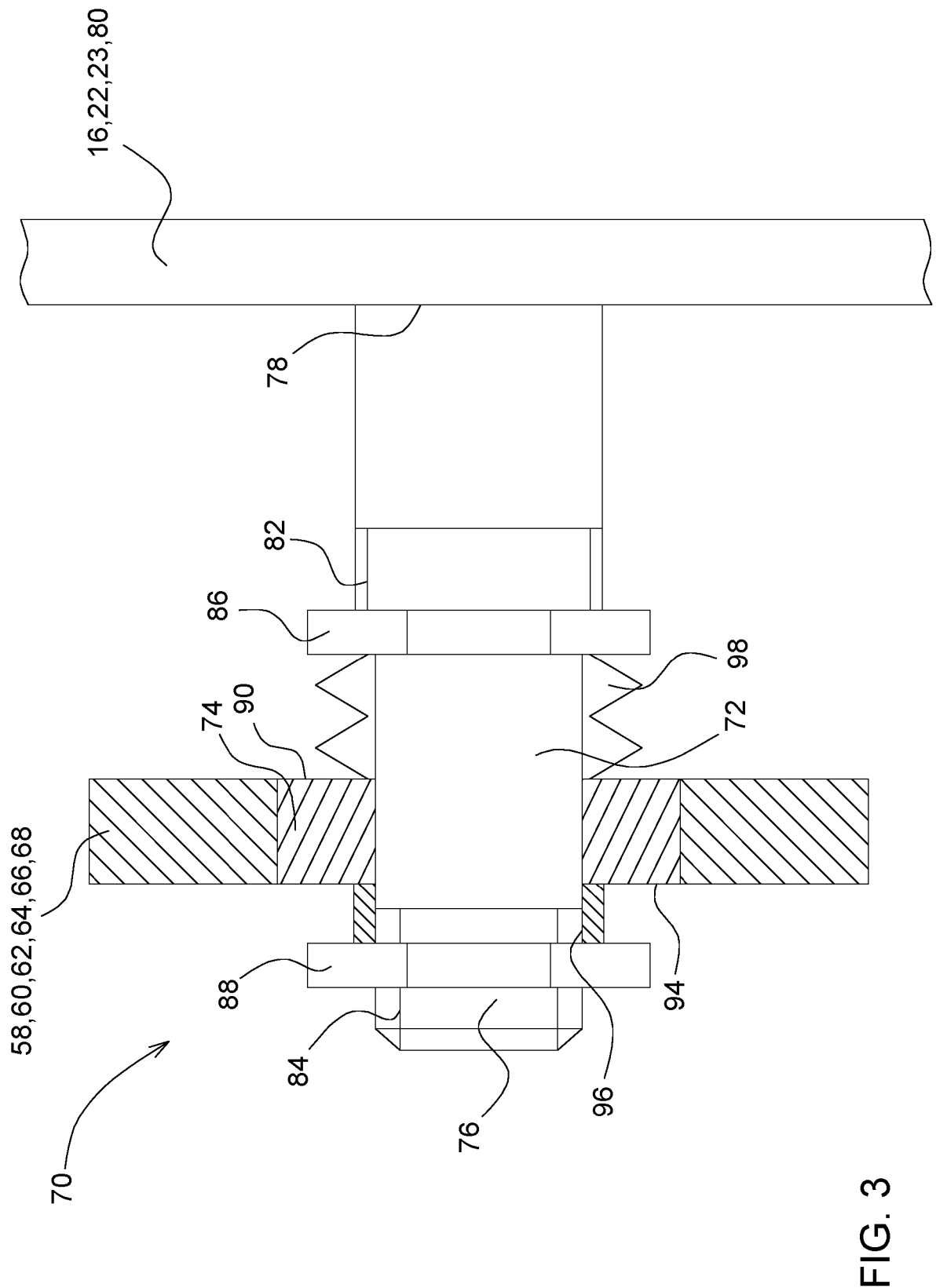
FIG. 3 is a schematic cross-sectional view of an alternative form of the sprocket adjuster for adjusting the sprocket of the chain drive from FIG. 1.

In an alternative embodiment, as shown in FIG. 3, the first spacer element 92 is replaced by a cup spring pair 98. Here, one or more cup springs 98 can be arranged behind one another. Likewise, the second spacer element 96 could also be replaced by one or more cup springs 98.

Figure 4:
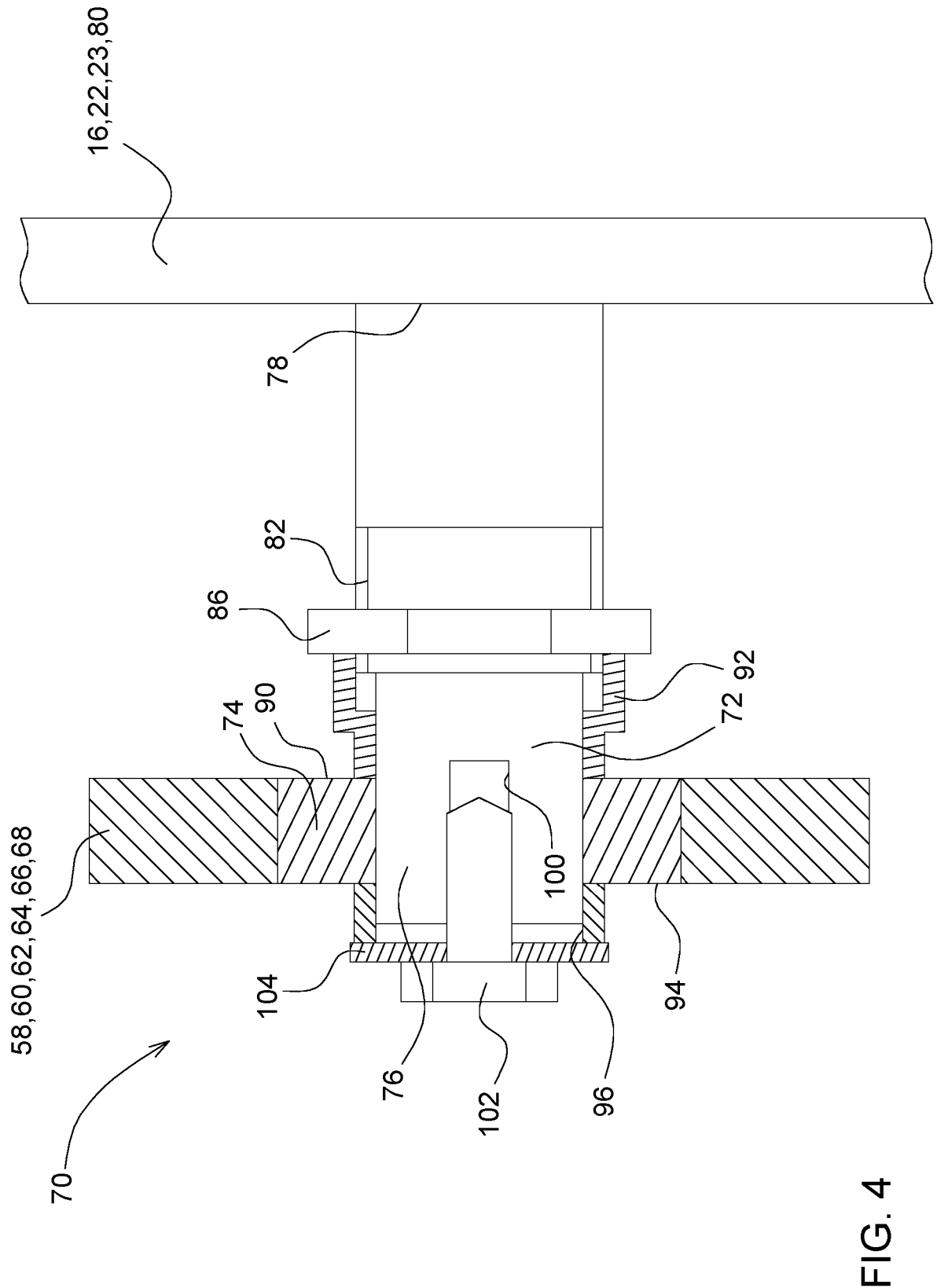
FIG. 4 is a schematic cross-sectional view of a further alternative form of the sprocket adjuster for adjusting the sprocket of the chain drive from FIG. 1.
Figure 5:
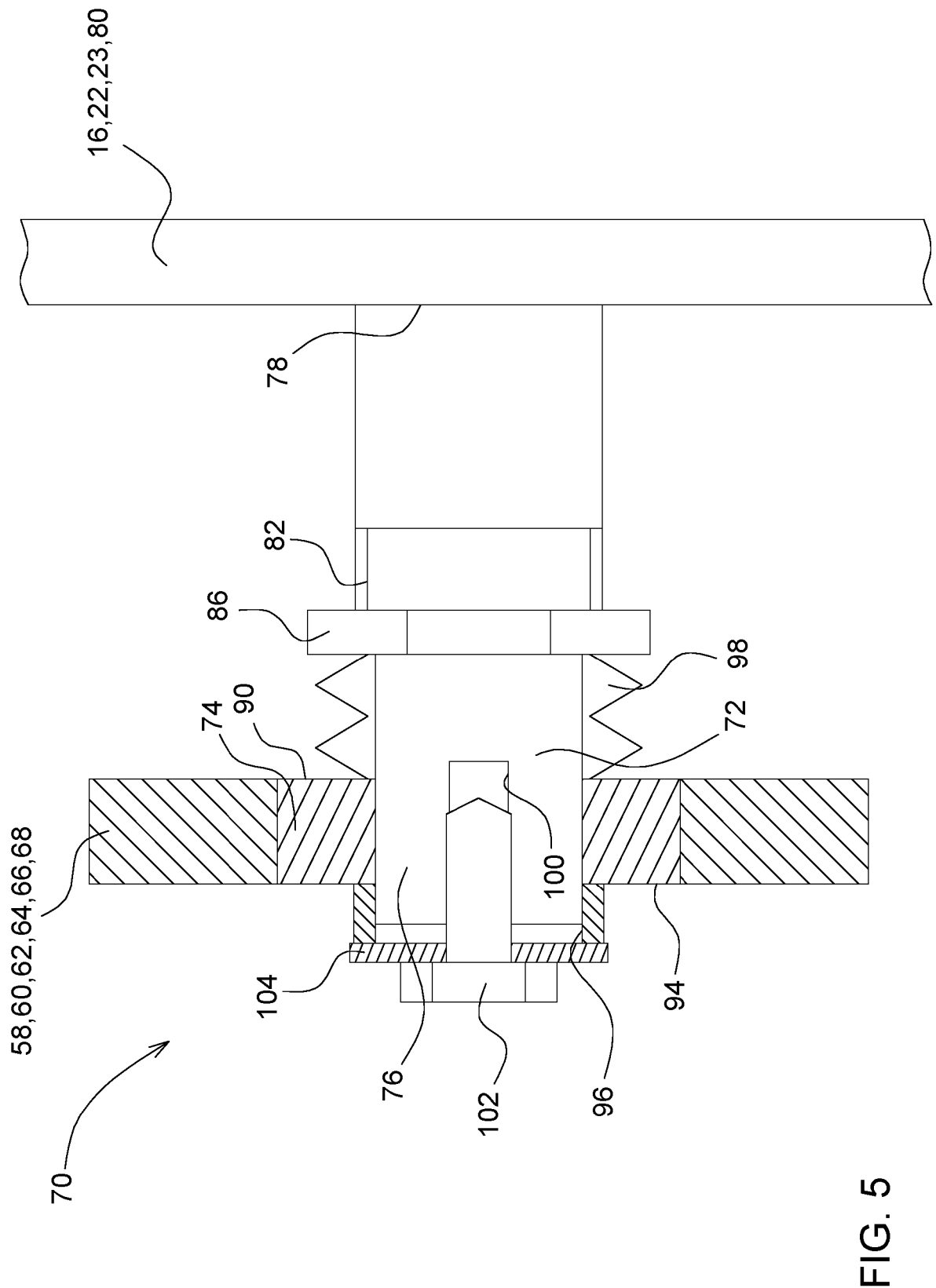
FIG. 5 is a schematic cross-sectional view of a further alternative form of the sprocket adjuster for adjusting the sprocket of the chain drive from FIG. 1.

Further alternative embodiments are shown in FIG. 4 or FIG. 5. Here, the second external thread region 84 and the second threaded nut 88 from FIGS. 2 and 3 have been replaced by an internal thread region 100 which is provided on the free end 76 of the bearing journal 72 and which has a clamping screw 102 held therein and a clamping plate 104. The internal thread on the internal thread region 100 in collaboration with the clamping screw 102 and the clamping plate 104 here display the same technical effect as the above-described second threaded nut 88 in collaboration with the second external thread region 84, with the rotary bearing 74 being clamped on the bearing journal 72 between the first external thread region 82 and the clamping plate 104. Consequently, the clamping function of the second threaded nut 88 on the second external thread region 84 of the preceding examples is replaced by the clamping plate 104. All further above-described embodiments can also be used in this alternative example. It is thus possible, for example, as shown in FIGS. 4 and 5, that a spacer element 92, 96, 98 can, in this case too, be provided between the first threaded nut 86 and/or the clamping plate 104 and the corresponding end face 90, 94 of the rotary bearing 74, with the spacer element 92, 96, 98 correspondingly also being able to take the form of a bush, sleeve, disc or cup spring.

By rotating the first and second threaded nuts 86, 88 or the first threaded nut 86 and the clamping screw 102 (in the case of the exemplary embodiment in FIG. 4), the position of the rotary bearing 74 can be changed axially with respect to the bearing journal 72 and a fine adjustment of the rotary bearing, and hence of the axial position of the sprocket with respect to the bearing journal 74, can be carried out. Should cup springs 98 be provided as spacer elements, it is possible, by virtue of the preloading applied by the cup spring 98, to achieve an axial displacement of the rotary bearing 74 just by adjusting only one threaded nut 86, 88 or by adjusting only the clamping screw 102 (in the case of the exemplary embodiment in FIG. 5).

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A chain drive for a work vehicle, the chain drive comprising:
   a journal having a free end and a fixed end;
   a rotary bearing arranged on the journal;
   a sprocket guided on the rotary bearing;
   wherein the bearing journal has a first external thread region proximate the fixed end of the journal and a second external thread region proximate the free end of the journal;
   a first threaded nut is arranged on the first external thread region, and a second threaded nut is arranged on the second external thread region, with the rotary bearing disposed between the first threaded nut and the second threaded nut, whereby the rotary bearing is clamped on the journal between the first threaded nut and the second threaded nut, and whereby an axial position of the rotary bearing and the sprocket along the journal is controllable by the position of the first threaded nut on the first external thread region and the position of the second threaded nut on the second external thread region.

2. The chain drive set forth in claim 1, further comprising a spacer disposed between the first threaded nut and an end face of the rotary bearing.

3. The chain drive set forth in claim 2, wherein the spacer is one of bushing, a sleeve, a disk, or a cup spring.

4. The chain drive set forth in claim 1, further comprising a spacer disposed between the second threaded nut and an end face of the rotary bearing.

5. The chain drive set forth in claim 4, wherein the spacer is one of bushing, a sleeve, a disk, or a cup spring.

6. The chain drive set forth in claim 1, wherein a diameter of the first external thread region is greater than a diameter of the second external thread region.

7. The chain drive set forth in claim 6, wherein the second external thread region extends starting from the free end of the journal to the rotary bearing.

8. The chain drive set forth in claim 7, wherein the first external thread region extends between the fixed end of the journal and the rotary bearing.

9. A round baler for compressing crop material into a bale, the round baler comprising:
   a frame member;
   a journal having a fixed end attached to the frame member and cantilevered out from the frame member to a free end;
   a rotary bearing arranged on the journal;
   a sprocket guided on the rotary bearing;
   a chain in meshing engagement with the sprocket;
   wherein the bearing journal has a first external thread region proximate the fixed end of the journal and a second external thread region proximate the free end of the journal;
   a first threaded nut is arranged on the first external thread region, and a second threaded nut is arranged on the second external thread region, with the rotary bearing disposed between the first threaded nut and the second threaded nut, whereby the rotary bearing is clamped on the journal between the first threaded nut and the second threaded nut, and whereby an axial position of the rotary bearing and the sprocket along the journal is controllable by the position of the first threaded nut on the first external thread region and the position of the second threaded nut on the second external thread region.

10. The round baler set forth in claim 9, further comprising a spacer disposed between the first threaded nut and an end face of the rotary bearing.

11. The round baler set forth in claim 10, wherein the spacer is one of bushing, a sleeve, a disk, or a cup spring.

12. The round baler set forth in claim 9, further comprising a spacer disposed between the second threaded nut and an end face of the rotary bearing.

13. The round baler set forth in claim 12, wherein the spacer is one of bushing, a sleeve, a disk, or a cup spring.

14. The round baler set forth in claim 9, wherein a diameter of the first external thread region is greater than a diameter of the second external thread region.

15. The round baler set forth in claim 14, wherein the second external thread region extends from the free end of the journal to the rotary bearing.

16. The round baler set forth in claim 15, wherein the first external thread region extends between the fixed end of the journal and the rotary bearing.

* * * * *